US012654846B2

(12) United States Patent (10) Patent No.: US 12,654,846 B2
Nicholson et al. (45) Date of Patent: Jun. 16, 2026

(54) VORTEX GENERATORS, AIRCRAFT SYSTEMS INCLUDING THE SAME, AND RELATED METHODS

(71) Applicant: The Boeing Company, Arlington, VA (US)

(72) Inventors: Douglas E. Nicholson, Saint Charles, MO (US); Frederick T. Calkins, Renton, WA (US); Zachary M. Jones, St. Peters, MO (US); Navid Daneshvaran, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 449 days.

(21) Appl. No.: 18/316,143

(22) Filed: May 11, 2023

(65) Prior Publication Data

US 2025/0333161 A1    Oct. 30, 2025

(51) Int. Cl.
*B64C 23/06* (2006.01)
*B64C 9/32* (2006.01)

(52) U.S. Cl.
CPC ................ *B64C 23/06* (2013.01); *B64C 9/32* (2013.01)

(58) Field of Classification Search
CPC ......... B64C 23/06; B64C 21/00; B64C 13/02; B64C 9/32
See application file for complete search history.

(56) References Cited

U.S. PATENT DOCUMENTS

| 8,657,238 | B2 | 2/2014 | Fox et al. |
| 9,638,176 | B2 | 5/2017 | Shivashankara et al. |
| 9,677,968 | B2 | 6/2017 | Griffiths et al. |
| 9,789,956 | B2 | 10/2017 | Bordoley et al. |
| 10,612,529 | B2 | 4/2020 | Nicholson et al. |
| 2010/0038492 | A1* | 2/2010 | Sclafani ................. B64C 23/06 |
| | | | 244/199.1 |
| 2022/0340264 | A1 | 10/2022 | Calkins et al. |

* cited by examiner

*Primary Examiner* — Timothy D Collins
*Assistant Examiner* — Justin Michael Heston
(74) *Attorney, Agent, or Firm* — Kolitch Romano Dascenzo Gates LLP

(57) ABSTRACT

Vortex generators include a vane that rotates between a stowed position and a deployed position. In the deployed position, the vane is configured to reduce noise created by an airflow around or along the aerodynamic surface. A spring controls deployment of the vane and includes an elongate tube formed of a superelastic shape memory alloy. To deploy or stow the vane, the elongate tube is twisted due to a stress-induced response caused by airflow around or along the aerodynamic surface, thereby building up and storing torque in the elongate tube. A mounting base receives the vane when it is in the stowed position, and operatively couples the vortex generator to the aerodynamic surface. To create the torque in the elongate tube, a first end of the elongate tube is fixed with respect to the aerodynamic surface while a second end of the elongate tube is free to rotate.

20 Claims, 12 Drawing Sheets

VORTEX GENERATORS, AIRCRAFT SYSTEMS INCLUDING THE SAME, AND RELATED METHODS

GOVERNMENT CONTRACT

This invention was made with Government support under Contract No. 693KA9-21-T-00001 awarded by (the FAA). The Government has certain rights in this invention.

FIELD

The present disclosure relates generally to vortex generators and more particularly to deployable vortex generators mounted on aerodynamic surfaces.

BACKGROUND

A vortex generator is an aerodynamic device, consisting of a small vane or flap that may be mounted on an aerodynamic surface to create a vortex in air flowing over the surface. Vortex generators may be used on many devices and vehicles, but are used most commonly on the nacelles, fuselages, and aerodynamic wing surfaces of aircraft. Vortex generators may be attached to a lifting surface (or airfoil, such as an aircraft wing) or a rotor blade of a wind turbine. Vortex generators generally are positioned obliquely with respect to the local airflow in order to create a vortex which draws energetic, rapidly moving outside air into the slow-moving boundary layer in contact with the surface. A turbulent boundary layer is less likely to separate than a laminar one, and therefore is desirable to ensure effectiveness of trailing-edge control surfaces. Vortex generators may be generally rectangular or triangular in shape and are mounted to extend substantially perpendicular to the surface on which they are mounted. Typically, vortex generators may be shaped to extend from the aerodynamic surface to about 80% as high as the boundary layer of air passing over the surface and extend span-wise near the thickest part of an aircraft wing.

When the airfoil, lifting surface, or aerodynamic surface of the body is in motion relative to the air, the vortex generator creates a vortex, which, by removing some part of the slow-moving boundary layer in contact with the airfoil surface, delays local flow separation and aerodynamic stalling. Vortex generators thus are often used to improve the effectiveness of wings and control surfaces, such as flaps, elevators, ailerons, and rudders. In one particular application, vortex generators may be spaced along the front third of a wing surface in order to maintain steady airflow over the control surfaces at the trailing edge of the wing. Vortex generators also have been used to disrupt flow to reduce noise pollution created by aircraft. A significant portion of the total noise generated by an aircraft in flight is caused by the flow of air along the external contours of the aircraft, largely due to the flow of air over or along control surfaces of the aircraft. This aerodynamically generated noise often causes a noise pollution, particularly in the landing approach of an aircraft, because in the landing configuration, the extended high lift flaps generate additional noise, and this noise is generated and radiated into the surrounding environment at a relatively low flight altitude. Vortex generators also have been used on the wing underside of aircraft to reduce noise generated by airflow over circular pressure equalization vents for the fuel tanks (which often produce a whistling noise when readying to land). Vortex generators can be positioned to help to reduce aircraft noise by disrupting air flows over ports on the wing or along the surface of the flaps.

While vortex generators may be used to reduce aircraft noise (e.g., during lift-off and landing approach), conventional static vanes used as vortex generators can cause interference during flap retraction on most modern aircraft that strive to optimize space for high lift systems in thin wing designs. In addition, because these static vanes remain deployed at all times during flight, this may result in unnecessary extra drag and resultant increase in fuel consumption. Vortex generators typically are most needed during low speed, low-altitude flight, such as during take-off and landing, though in other applications, they may be needed only during high-speed, high-altitude cruise.

In response to the potential negative effects of static vortex generators, deployable vortex generators have been developed in which the aerodynamic surface or flap of the vortex generator is deployed only during take-off, landing, and other low speed operation, and is otherwise stowed and removed from exposure to air flow during cruise. For example, U.S. Pat. No. 9,638,176 discloses a deployable vortex generator that uses a shape memory alloy actuator to deploy or stow the vortex generator in response to changes in ambient temperature and/or in response to changes in temperature created by a heating element. Shape memory alloy actuators have been used to generate a motive force via a phase change within a shape memory alloy element thereof, and this phase change may be initiated by a temperature change. As an example, the shape memory alloy element may transition from a martensite state to an austenite state upon being heated, and also may transition from the austenite state to the martensite state upon being cooled. However, heating systems add costs, and ambient temperatures may not always be within the desired range for deployment and retraction at desired times. Attempts at utilizing torsion springs to deploy vortex generators may require the use of torsion springs that are too large to embed within the wing skin, thereby interfering with aerodynamics of the wing, and/or may require active actuation systems to actuate the torsion spring deployment when desired.

SUMMARY

Presently disclosed spring-loaded vortex generators may be configured to deploy or retract in coordination with the high lift system in response to changing aerodynamic load, and/or by mechanically interacting with the system. These spring-loaded vortex generators use superelastic shape memory alloy torsional spring elements to accommodate and recover the deformation associated with stowing the vortex generators, thereby allowing for a compact, surface mounted design. This smaller volume may enable placement of the vortex generators in, for example, the skin of an aircraft wing. Disclosed vortex generators utilize elongate tubes as a rotary spring, which can enable a smaller footprint device than those that employ conventional torsional springs.

In an exemplary example, disclosed vortex generators may include a vane configured to be operatively coupled to an aerodynamic surface of a vehicle, a spring operatively coupled to the vane, and a mounting base. The vane may be configured to rotate between a stowed position and a deployed position, and the vortex generator may be configured to reduce noise created by an airflow around or along the aerodynamic surface when the vane is in the deployed position. The spring may include an elongate tube comprising a superelastic shape memory alloy, and may be configured to cause the vane to rotate from the stowed position to the deployed position when the elongate tube is twisted in a first direction. The elongate tube may be configured to twist in the first direction due to a stress-induced response that causes the elongate tube to twist, and the elongate tube may be configured to undergo a stress-induced phase transformation as a result of activation of the spring that twists the elongate tube in the first direction. The mounting base may be configured to receive the vane when the vane is in the stowed position, and the mounting base may be configured to operatively couple the vortex generator to the aerodynamic surface of the vehicle. A first end of the elongate tube may be fixed with respect to the aerodynamic surface of the vehicle, and a second end of the elongate tube may be free to rotate with respect to the mounting base and the aerodynamic surface of the vehicle. The elongate tube thus may be configured such that torque is built up within the elongate tube as the stress-induced response causes the elongate tube to twist.

Aircraft systems including such vortex generators also are disclosed, and generally additionally include the aerodynamic surface, which may be a portion of a wing skin of an aircraft. In such aircraft systems, the vane may be configured to be moved to the stowed position by a flap of the vehicle.

Related methods also are disclosed, and may include forming one or more vortex generators and operatively coupling the one or more vortex generators to the aerodynamic surface of the vehicle. In disclosed examples, the vehicle may be an aircraft and the aerodynamic surface of the vehicle may be a wing of the aircraft, though disclosed vortex generators and methods may be utilized in connection with other types of vehicles.

DESCRIPTION

Figure 1:
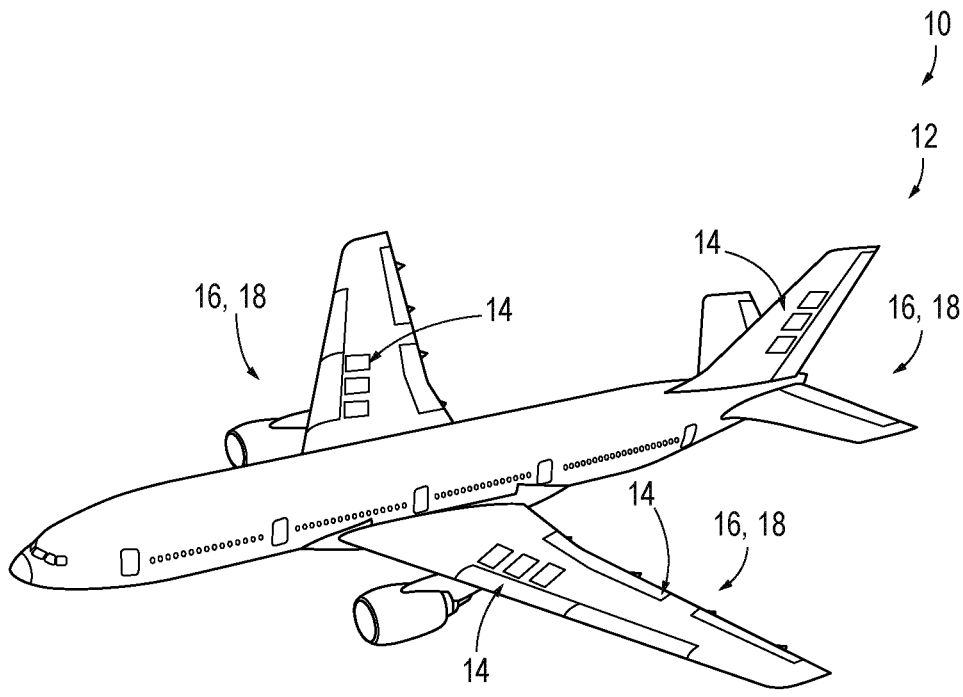
FIG. 1 is a perspective of a vehicle that incorporates one or more vortex generators according to the present disclosure.

FIG. 1 is a schematic representation of a vehicle 10, in the form of an aircraft 12, that incorporates presently disclosed vortex generators 14. While vortex generators 14 are described herein as used in connection with aircraft 12 and aircraft systems, vortex generators 14 may be used with different types of vehicles 10, other aerodynamic surfaces, or other structures, such as sail boat sails, marine vehicles, an engine propeller, a windmill, spacecraft, automobiles, land vehicles, and/or spacecraft reentry vehicles. Generally, vortex generators 14 are configured to be deployed (e.g., be transitioned to a deployed position) when in used, and stowed (e.g., transitioned to a stowed position) when not in use. For example, vortex generators 14 may be configured to be in the deployed position during low speed flight (e.g., takeoff and approach to landing and/or landing) of aircraft 12, and in the stowed position during cruise flight of aircraft 12. As used herein, "low speed flight" corresponds to the speeds of aircraft 12 such as would be used during takeoff and during approach to landing. Vortex generators 14 generally are configured to reduce noise created by an airflow around or along the aerodynamic surface when a vane of vortex generator 14 is in the deployed position. Vortex generators 14 generally are configured to have a reduced drag when the vane is in the stowed position than when the vane is in the deployed position.

One or more vortex generators are operatively coupled to an aerodynamic surface 16 of vehicle 10, such as by being mounted on a lifting surface 18 of aircraft 12. Examples of lifting surfaces 18 include, but are not limited to, the wings, nacelles, flap, empennage, a control surface such as an elevator and an aileron, an engine strut, or a wind turbine blade. Additionally or alternatively, vortex generators 14 may be positioned on aircraft antennae, doors, and/or vertical stabilizers. Nonlimiting examples of general placement of vortex generators 14 are schematically represented, and vortex generators 14 are not drawn to scale in FIG. 1. Vehicles may include any desired number of vortex generators 14, with the number and positions varying depending on the model of the aircraft 12 or other vehicle 10 and/or on desired outcomes or expected environmental conditions. Examples are not limited to lifting surface applications, and disclosed vortex generators 14 may be utilized with other fluid dynamic surface applications such as sail boat sails, engine propellers, windmills, and others.

FIGS. 2-6 provide illustrative, non-exclusive examples of vortex generators 14 according to the present disclosure. Elements that serve a similar, or at least substantially similar, purpose are labeled with like numbers in each of FIGS. 2-6, and these elements may not be discussed in detail herein with reference to each of FIGS. 2-6. Similarly, all elements may not be labeled in each of FIGS. 2-6, but reference numerals associated therewith may be utilized herein for consistency. Elements, components, and/or features that are discussed herein with reference to one or more of FIGS. 2-6 may be included in and/or utilized with any of FIGS. 2-6 without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Figure 2:
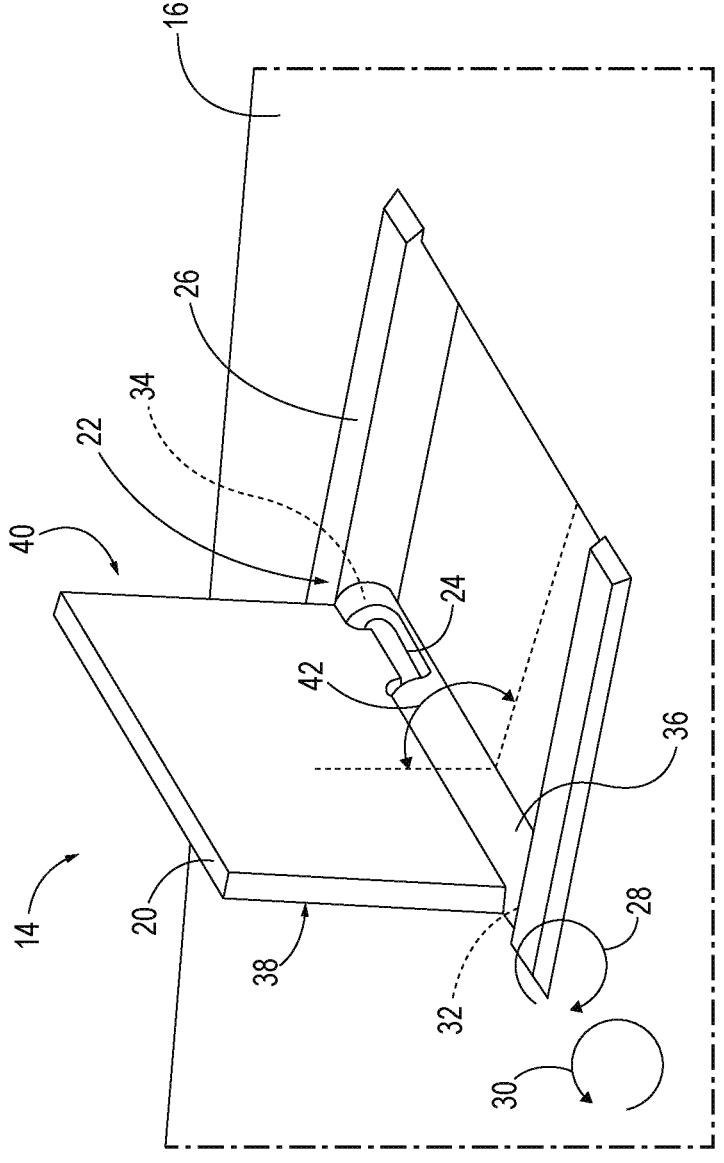
FIG. 2 is a schematic representation of examples of vortex generators according to the present disclosure, shown operatively coupled to a mounting base.
Figure 3:
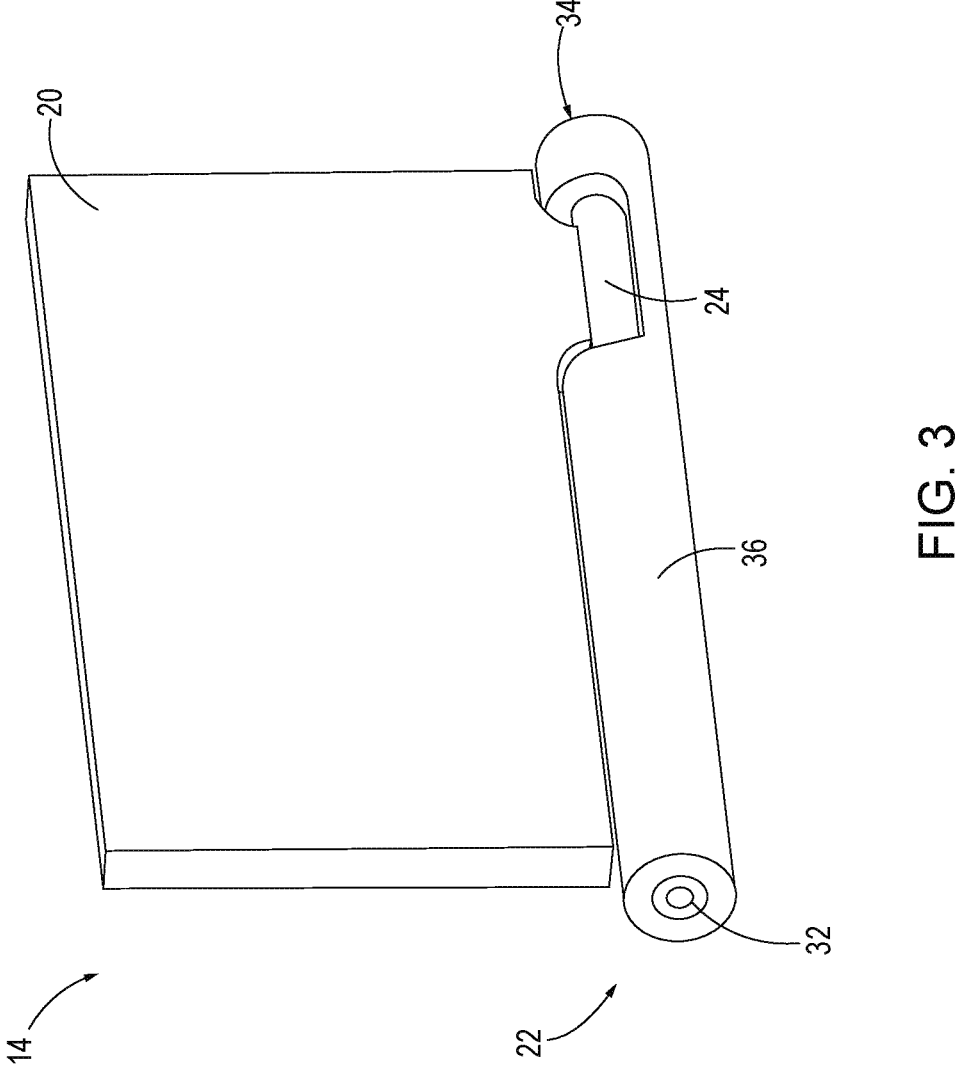
FIG. 3 is a schematic representation of the vortex generator of FIG. 2, shown within the mounting base.

FIGS. 2-3 schematically represents non-exclusive examples of vortex generators 14, and show vortex generator 14 in the deployed position, with a vane 20 oriented substantially perpendicularly to aerodynamic surface 16 (FIG. 2). FIG. 3 schematically represents vortex generator 14 shown apart from a mounting base 26 and aerodynamic surface 16, which are shown in FIG. 2. While FIG. 2 illustrates vane 20 perpendicular to aerodynamic surface 16, in various examples of vortex generators 14, vane 20 may be configured to be at a non-perpendicular angle with respect to aerodynamic surface 16. Vane 20 is operatively coupled to aerodynamic surface 16 such that vane 20 is configured to rotate between the deployed position shown in FIG. 2 and a stowed position. In some examples, vane 20 is at least substantially parallel to and/or flush with aerodynamic surface 16 when vane 20 is in the stowed position. In some examples, vane 20 may be configured to rest on or against aerodynamic surface 16 when vane 20 is in the stowed position.

A spring 22 is operatively coupled to vane 20, and includes an elongate tube 24 formed of a superelastic shape memory alloy. Spring 22 is configured to cause vane 20 to rotate between the deployed position and the stowed position. For example, twisting of elongate tube 24 in a first direction (e.g., a clockwise direction as viewed in this example, indicated by arrow 28) causes vane 20 to be rotated downward towards aerodynamic surface 16, and thus towards the stowed position. On the other hand, twisting of elongate tube 24 in a second direction 30 opposite first direction 28 causes vane 20 to be rotated upward away from aerodynamic surface 16 and towards the deployed position. Vane 20 may be coupled directly to elongate tube 24, such that twisting of elongate tube 24 may be configured to cause rotation of vane 20. Elongate tube 24 is configured to twist in first direction 28 and/or second direction 30 due to a stress-induced response that causes elongate tube 24 to twist and/or due to a reduction or removal of a load that causes the stress-induced response. Elongate tube 24 is configured to undergo a stress-induced phase transformation as a result of activation of spring 22 that twists elongate tube 24 in first direction 28 and/or second direction 30. In this manner, spring 22 may be said to be passively actuated via changing aerodynamic loads on vane 20 created by airflow around or along aerodynamic surface 16.

Such stress-induced superelastic responses, or twisting of elongate tube 24, may be caused or induced by external loads on vane 20, such as by structures of the vehicle (e.g. flaps) physically exerting force on vane 20. Additionally or alternatively, stress-induced responses, or twisting of elongate tube 24, may be caused or induced by forces created by airflow around or along aerodynamic surface 16 when the vehicle is in motion (e.g., aircraft). Vortex generator 14 may be oriented with respect to aerodynamic surface 16 to create the desired effect. For example, vane 20 may be oriented such that an airflow around or along aerodynamic surface 16 acts to urge vane 20 towards the deployed position. In other examples, vane 20 may be oriented such that an airflow around or along aerodynamic surface 16 acts to urge vane 20 towards the stowed position. Elongate tube 24 also may be configured to twist, thereby moving vane 20, in response to an increase in temperature of spring 22 and/or in response to a decrease in temperature of spring 22, via a temperature-induced response in the shape memory alloy forming elongate tube 24. Additionally or alternatively, flaps of the vehicle may be configured to move vane 20 to the stowed position by exerting a force on vane 20, pushing it down towards aerodynamic surface 16. In some examples, vortex generator 14 is configured such that vane 20 is in the stowed position when the flaps of the vehicle are stowed.

Elongate tube 24 may be formed of any suitable shape memory alloy. One family of suitable materials include nickel titanium (NiTi) alloys. In a specific example, the shape memory alloy forming elongate tube 24 may include 50-51.5% nickel. All compositions listed are in atomic percent (at %). In other examples, the shape memory alloy forming elongate tube 24 may include a higher or lower percentage of nickel. For example, the shape memory alloy may include at least 35% nickel, at least 40% nickel, at least 45% nickel, at least 50% nickel, at least 55% nickel, and/or at least 60% nickel, with some or all of the balance being titanium. The shape memory alloy may include one or more additional alloying elements configured to control the transformation temperature of the shape memory alloy. For example, the shape memory alloy may include additional Iron (Fe), Niobium (Nb), Hafnium (Hf), Copper (Cu), Palladium (Pd), Platinum (Pt), and/or Zirconium (Zr).

Vortex generator 14 includes a mounting base 26 configured to receive vane 20 when vane 20 is in the stowed position. Mounting base 26 is configured to operatively couple vortex generator 14 to aerodynamic surface 16 of the vehicle. Mounting base 26 may, for example, be coupled to aerodynamic surface 16 via a plurality of rivets or other fasteners, brazing, welding, and/or via epoxy or other adhesives. In some examples, mounting base 26 is integrally formed with aerodynamic surface 16 such that mounting base 26 and aerodynamic surface 16 form a unitary structure. In some examples, vortex generator 14 is configured to be surface-mounted such that it does not protrude through aerodynamic surface 16 of the vehicle. Vane 20 and spring 22 may be preassembled together and mounted or positioned within mounting base 26.

A first end 32 of elongate tube 24 is fixed with respect to aerodynamic surface 16 of the vehicle, while a second end 34 of elongate tube 24 is free to rotate with respect to mounting base 26 and aerodynamic surface 16 of the vehicle. In this manner, elongate tube 24 is configured such that torque is built up within elongate tube 24 as the stress-induced response caused by external loads on vane 20 causes elongate tube 24 to twist. Because elongate tube 24 is coupled to vane 20, elongate tube 24 is configured to transmit torque to vane 20. Elongate tube 24 therefore may be said to act as a rotary spring. In some examples, vane 20 is coupled to elongate tube 24 at or near first end 32, such as within a region of elongate tube 24 adjacent first end 32 of elongate tube 24. In some examples, vane 20 is coupled to elongate tube 24 at or near second end 34, such as within a region of elongate tube 24 adjacent second end 34 of elongate tube 24

Spring 22 may include a support shell 36, and elongate tube 24 may be rotatably retained in support shell 36. Vane 20 may be fixed to elongate tube 24 such that when elongate tube 24 is twisted, vane 20 rotates with elongate tube 24 relative to support shell 36. In this manner, support shell 36 may be configured to act as a rotational bearing. Spring 22 may be configured to rotate vane 20 relative to support shell 36 from the stowed position to the deployed position. In some examples, vane 20 is substantially parallel to aerodynamic surface 16 when vane 20 is in the stowed position. Additionally or alternatively, vane 20 is non-parallel to aerodynamic surface 16 when vane 20 is in the deployed position. For example, vane 20 may be substantially perpendicular to aerodynamic surface 16 when vane 20 is in the deployed position, or vane 20 may be oriented at an acute or obtuse angle with respect to aerodynamic surface 16.

Vortex generators 14 may be configured to be reconfigurable. For example, a spring rate of elongate tube 24 may be configured to be actively tuned for changing environmental conditions by actively heating the shape memory alloy that forms elongate tube 24, such that the spring rate may be selectively changed (e.g., increased or decreased) for expected conditions and/or for different applications. For example, a heater or heating element may be used to actively vary the stiffness of the spring response of spring 22. The spring rate of spring 22 may be actively tunable to application requirements by selection of shape memory alloy material composition and processing and component geometry, and/or passively tunable with temperature changes. For example, different compositions and processing of shape memory alloys (e.g., different percentages of nickel and titanium, and/or different additional elements added to the alloy) may be used to control stiffness and superelastic properties of spring 22.

Some examples of vortex generators 14 include a stop configured to prevent rotation of vane 20 beyond a predetermined position relative to aerodynamic surface 16. In some examples, rotation of vane 20 may be limited by mounting base 26, support shell 36, by material properties of elongate tube 24, and/or the way elongate tube 24 interacts with support shell 36 and/or mounting base 26. In this manner, vane 20 may have a predetermined position in the deployed position, or a predetermined position that corresponds to the maximum extent vane 20 may be deployed. Stated another way, vortex generators 14 may have a controlled deployment angle 42 in the deployed position, with deployment angle 42 being formed between vane 20 and aerodynamic surface 16. In some examples, the predetermined position is substantially perpendicular to aerodynamic surface 16. In some examples, when vane 20 is in the deployed position, vane 20 is configured to be arranged at an angle relative to aerodynamic surface 16 and the direction of airflow around or along aerodynamic surface 16 such that vane 20 is configured to act on the airflow to create vortices during low speed flight. On the other hand, when vane 20 is in the stowed position, vane 20 may be substantially aligned with the direction of airflow around or along aerodynamic surface 16 such that vane 20 may be at least substantially removed from the airflow to reduce drag. Vane 20 may be said to have a leading edge 38 and a trailing edge 40, with leading edge 38 being directed towards the direction of travel of the vehicle.

Figure 4:
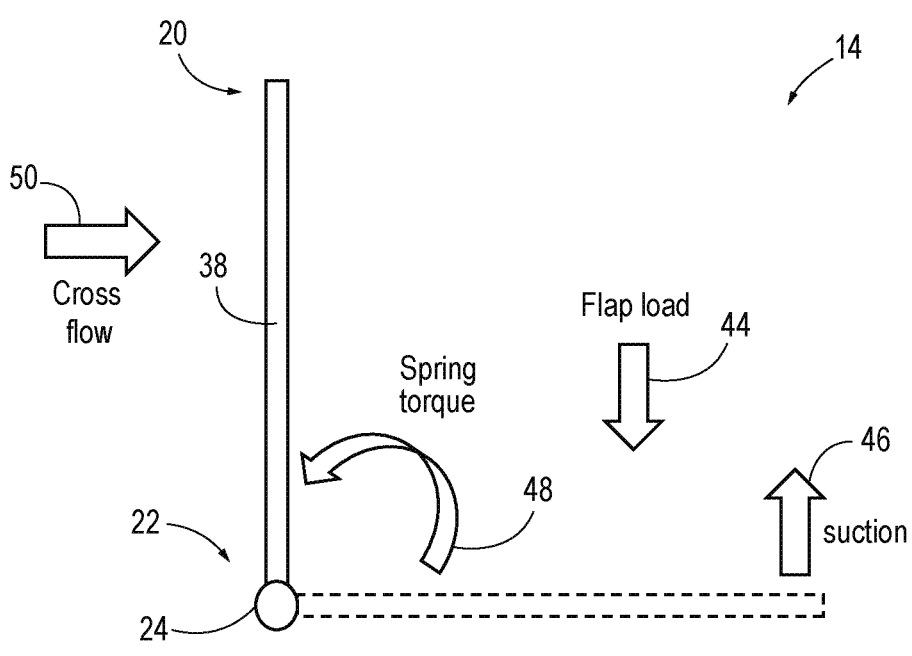
FIG. 4 is a schematic diagram of an example of an orientation of disclosed vortex generators relative to the direction of cross flow.
Figure 5:
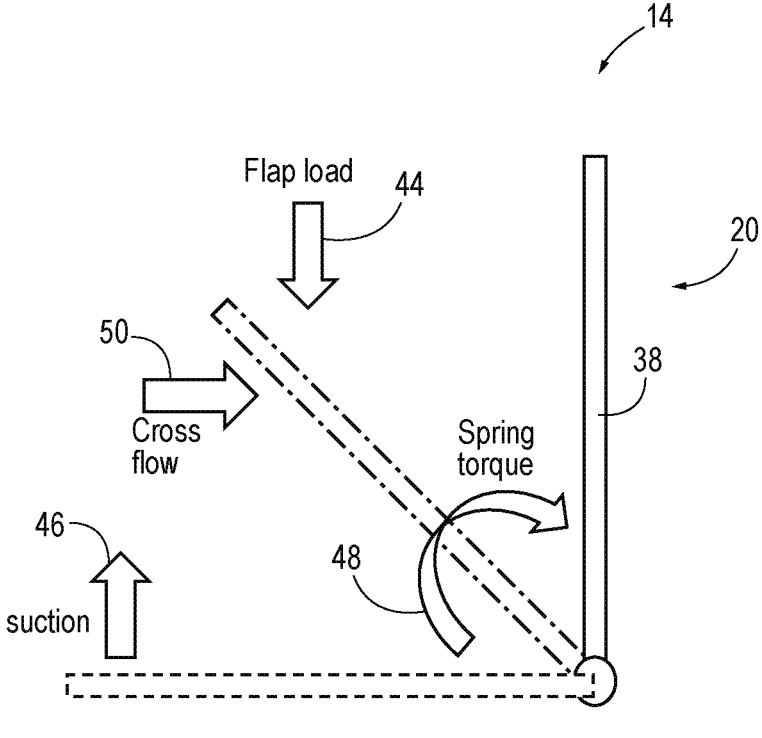
FIG. 5 is a schematic diagram of an example of an orientation of disclosed vortex generators relative to the direction of cross flow.
Figure 6:
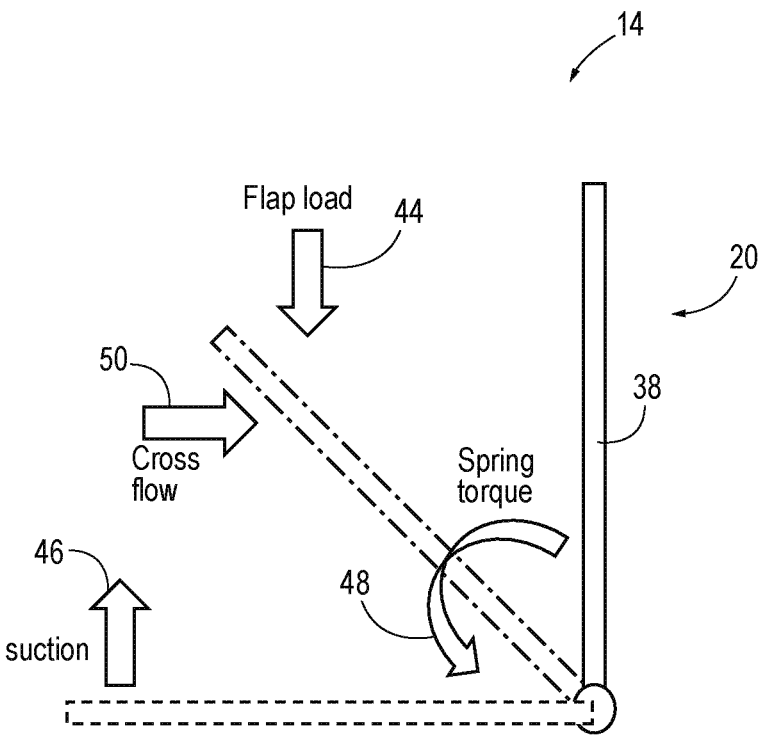
FIG. 6 is a schematic diagram of an example of an orientation of disclosed vortex generators relative to the direction of cross flow.

FIGS. 4-6 schematically represent different examples of orientations of vortex generators 14 with respect to aerodynamic surface 16, showing an elevation view of leading edge 38 of vane 20. In the examples of FIGS. 4-6, vane 20 is shown in the deployed position in solid lines, and in the stowed position in dashed lines. FIGS. 5-6 additionally illustrate an intermediate position in dash-dot lines, wherein the intermediate position is between the stowed position and the deployed position. As indicated in FIG. 4, vane 20 may be positioned and oriented such that a load from a flap of the vehicle acts to push against spring 22 to urge vane 20 towards the stowed position (indicated by arrow 44), while suction (indicated by arrow 46) and spring torque (indicated by arrow 48) act to urge vane 20 towards the deployed position. Spring 22 may be configured to overcome an aerodynamic cross flow (indicated by arrow 50). In this example, vortex generator 14 may be configured to be moved to an outboard area of the vehicle, though spring 22 may be sized larger to overcome the aerodynamic load, thereby resulting in a larger load on the vehicle flap to move vane 20 to the stowed position.

In the example of FIG. 5, vane 20 is positioned and oriented with respect to the aerodynamic load such that cross flow 50 acts with spring torque 48 to urge vane 20 towards the deployed position. Flap load 44 from the vehicle flap acts to urge vane 20 towards the stowed position. In this example, vortex generator 14 may be configured for faster deployment when the vehicle flap system is deployed, and spring torque 48 may be lower than in other examples, which may facilitate integration of vortex generator 14 into aerodynamic surfaces 16. In the example of FIG. 6, aerodynamic load from cross flow 50 acts to urge vane 20 towards the deployed position, while spring torque 48 and flap load 44 act to urge vane 20 towards the stowed position. Because the spring torque 48 acts to urge vane 20 towards the stowed position, flap load 44 may be reduced to stow vane 20 in this arrangement.

Turning now to FIGS. 7-14, illustrative non-exclusive examples of vortex generators 14 and systems including the same are illustrated. Where appropriate, the reference numerals from the schematic illustrations of FIGS. 2-6 are used to designate corresponding parts in FIGS. 7-14; however, the examples of FIGS. 7-14 are non-exclusive and do not limit vortex generators 14 to the illustrated examples of FIGS. 7-14. That is, vortex generators 14 are not limited to the specific examples illustrated in FIGS. 7-14 and may incorporate any number of the various aspects, configurations, characteristics, properties, that are illustrated in and discussed with reference to the schematic representations of FIGS. 2-6 and/or the examples of FIGS. 7-14, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 7-14; however, it is within the scope of the present disclosure that the previously discussed features, variants, etc. may be utilized therewith.

Figure 7:
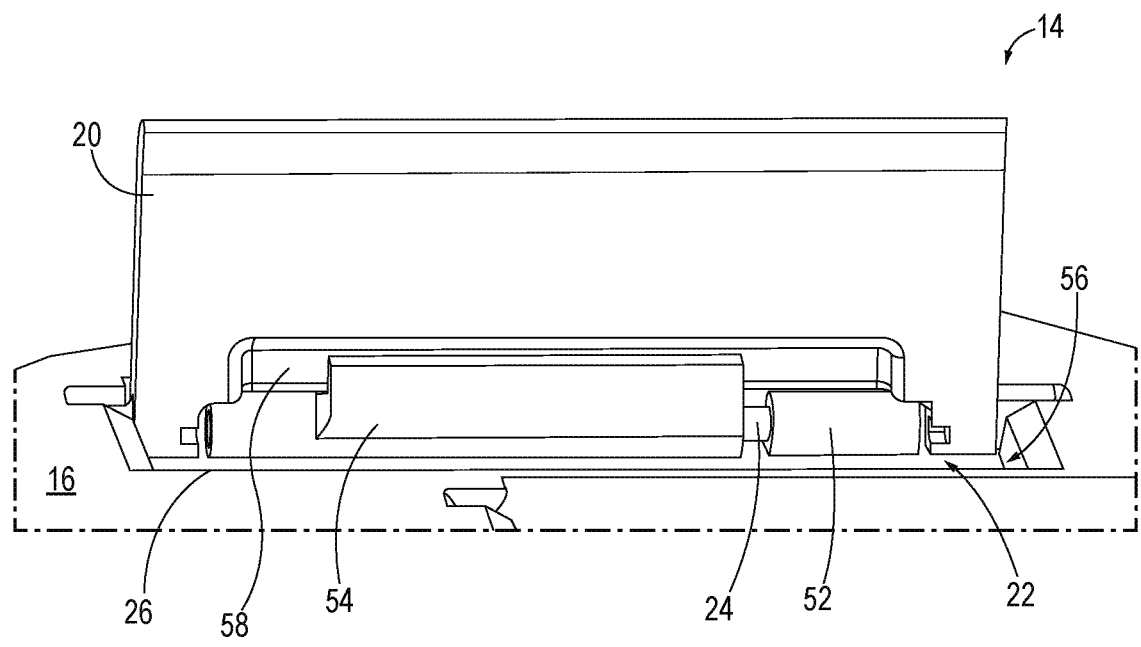
FIG. 7 is a front view of an example of a disclosed vortex generator, shown in a deployed position.
Figure 8:
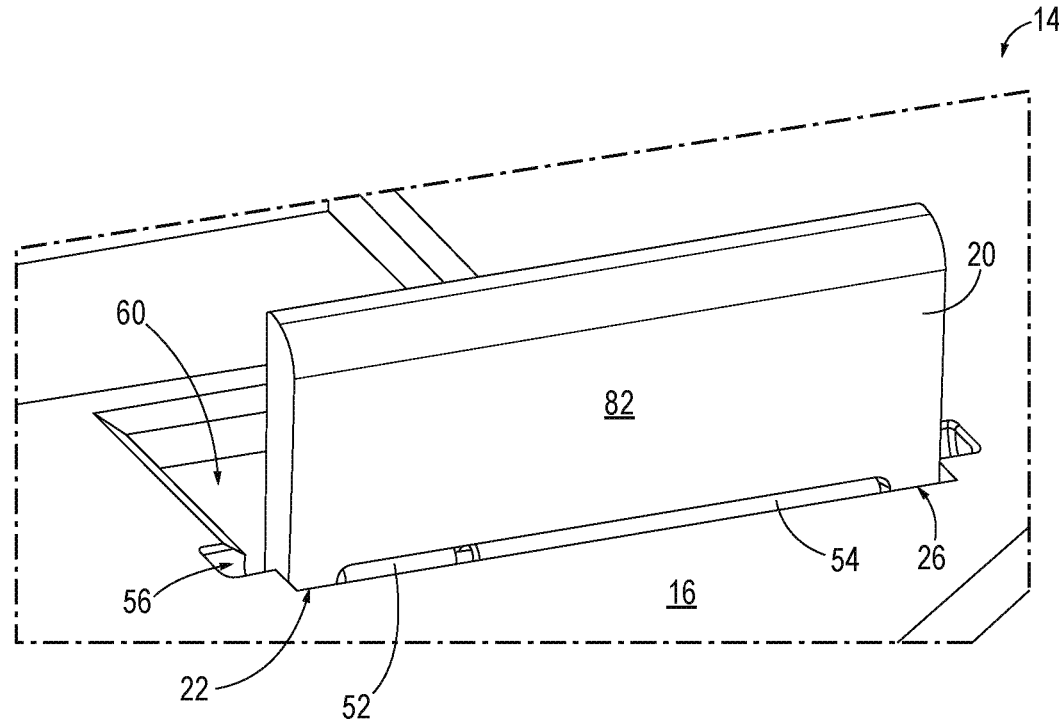
FIG. 8 is a back view of the vortex generator of FIG. 7.
Figure 9:
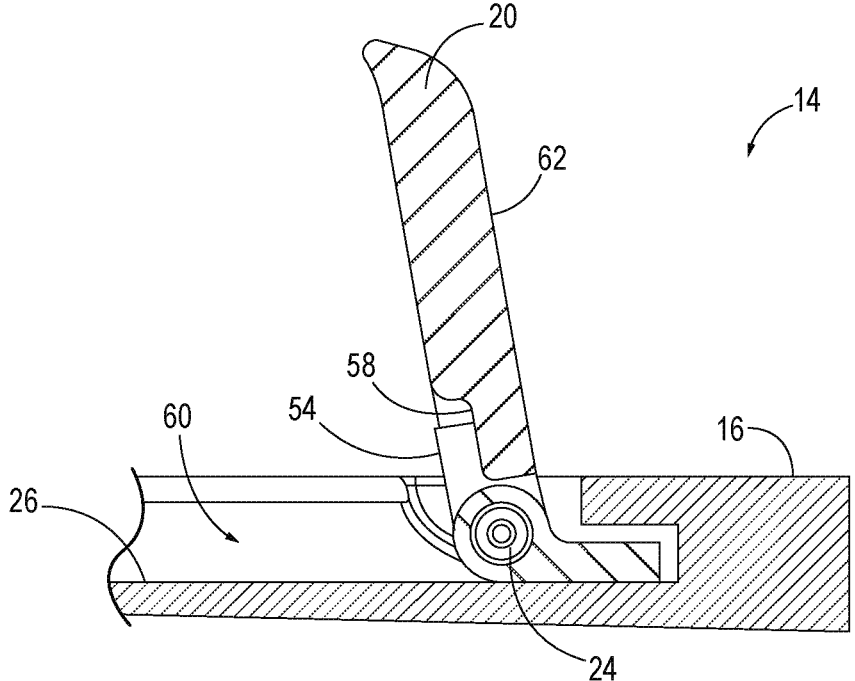
FIG. 9 is a cross-sectional view of an example of a vortex generator according to the present disclosure.

FIGS. 7-8 illustrate an example of vortex generator 14, shown with vane 20 in the deployed position. In the example of FIGS. 7-8, spring 22 includes a first torque flange 52 and a second torque flange 54. First torque flange 52 is fixed with respect to a slot 56 in mounting base 26, and second torque flange 54 is fixed with respect to vane 20. For example, second torque flange 54 may be engaged with a slot or recess 58 formed in vane 20 (FIG. 7). Elongate tube 24 may extend through first torque flange 52 and second torque flange 54, and may be attached or coupled to first and second torque flanges 52, 54, such as via adhesive, crimping, swaging, and/or other coupling. Mounting base 26 may include a recess 60 in which vane 20 may rest when vortex generator 14 is in the stowed position. In other words, recess 60 of mounting base 26 may be configured to receive vane 20 when vane 20 is in the stowed position. In some examples, a first surface, or side 82 of vane 20 may be substantially flush with aerodynamic surface 16 when vane 20 is stowed in recess 60. FIG. 9 shows a cross-sectional view of vortex generator 14 of FIGS. 7-8.

Figure 10:
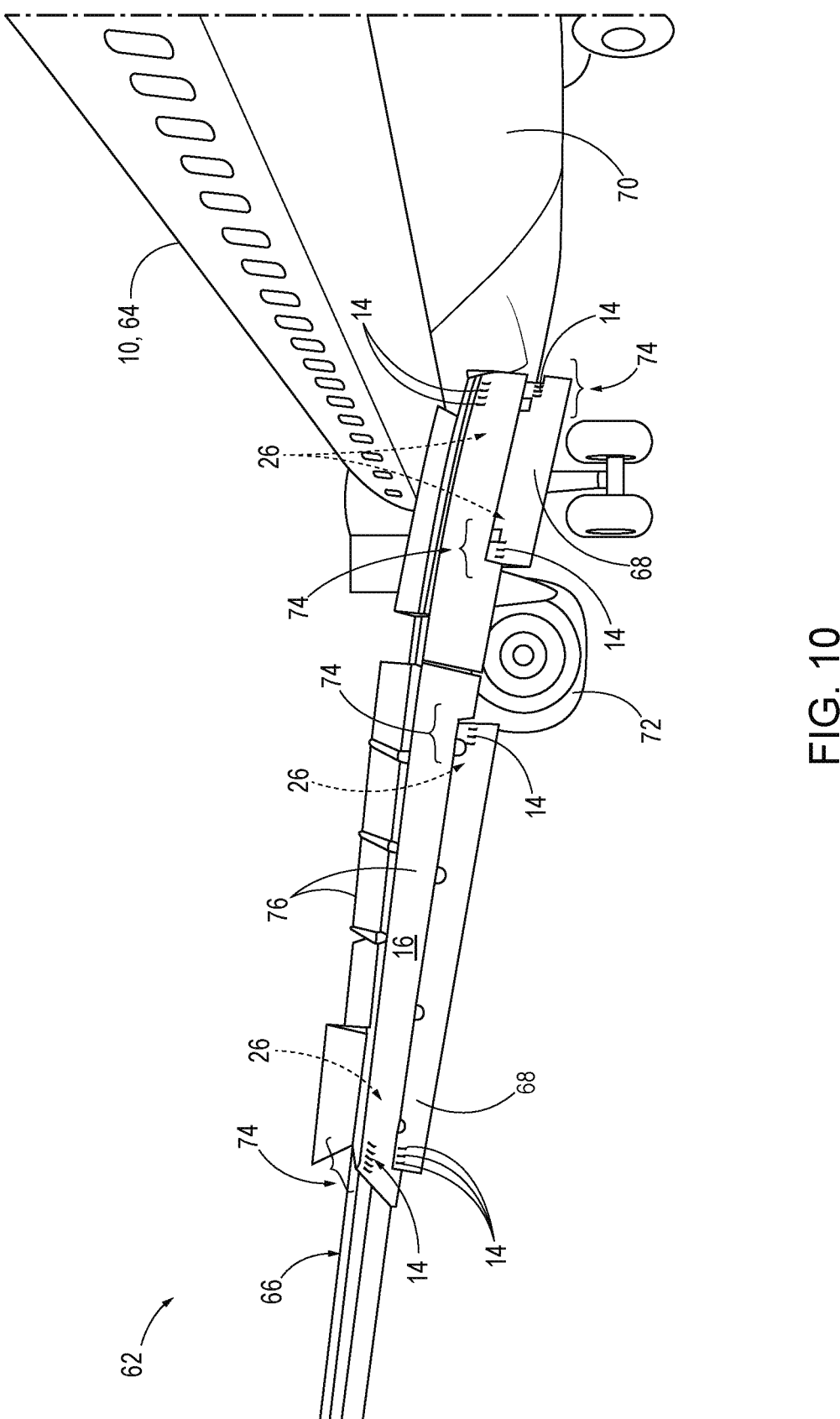
FIG. 10 is a perspective view of an example of an aircraft system according to the present disclosure.

FIG. 10 illustrates an example of an aircraft system 62 including a plurality of vortex generators 14 positioned on aircraft 64 (which is an example of vehicle 10). One or more vortex generators 14 may be placed on one or more aerodynamic surfaces 16 of aircraft 64, such as on a wing 66. In one example, vortex generators 14 may be positioned on a trailing edge flap 68. As shown in FIG. 10, aircraft systems 62 may include one or more groups 74 of vortex generators 14 in different areas of wing 66, or in other locations on aircraft 64. In FIG. 10, aircraft system 62 includes a group 74 of vortex generators 14 positioned near fuselage 70 of aircraft 64, another respective group 74 of vortex generators 14 positioned near an engine housing 72 of aircraft 64, along with other respective groups 74 of vortex generators 14 positioned in other locations along wing 66. In various examples of aircraft systems 62, vortex generators 14 may be grouped together into one or more groups 74 as shown, and/or may be individually positioned in one or more areas of aircraft 64 or other vehicle 10. The groups 74 shown in FIG. 10 are for illustrative purposes only, and are not limiting of disclosed aircraft systems 62 or vortex generators 14.

Aircraft system 62 may include one or more respective mounting bases 26 per group 74 of vortex generators 14, and/or one or more respective mounting bases per respective vortex generator 14. As described above, mounting base 26 is configured to operatively couple one or more vortex generators 14 to aerodynamic surface 16 (e.g., to wing 66). Each mounting base 26 may be integrally formed with aerodynamic surface 16 (e.g., wing 66), coupled to aerodynamic surface 16 using one or more fasteners, coupled to aerodynamic surface 16 using an epoxy or other adhesive, and/or surface-mounted to aerodynamic surface 16. In some examples, vortex generators 14 and mounting bases 26 may be configured such that vortex generator 14 does not protrude through aerodynamic surface 16.

In some examples, a flap 76 of aircraft 64 is configured to act on one or more vortex generators 14 to transition vane 20 to the stowed position. For example, as trailing edge flap 68 is retracted, flap 76 may push vanes 20 downward into their stowed positions. Additionally or alternatively, vortex generators 14 may be configured such that vanes 20 are in the stowed position when flaps 68 of aircraft 64 are stowed. One or more vortex generators 14 may be positioned on wing 66 such that vanes 20 are oriented with respect to aerodynamic surface 16 such that an airflow around or along the aerodynamic surface acts to urge vanes 20 towards the deployed position. Additionally or alternatively, one or more vortex generators 14 of aircraft system 62 may be oriented with respect to aerodynamic surface 16 such that an airflow around or along the aerodynamic surface acts to urge vanes 20 towards the stowed position.

Figure 11:
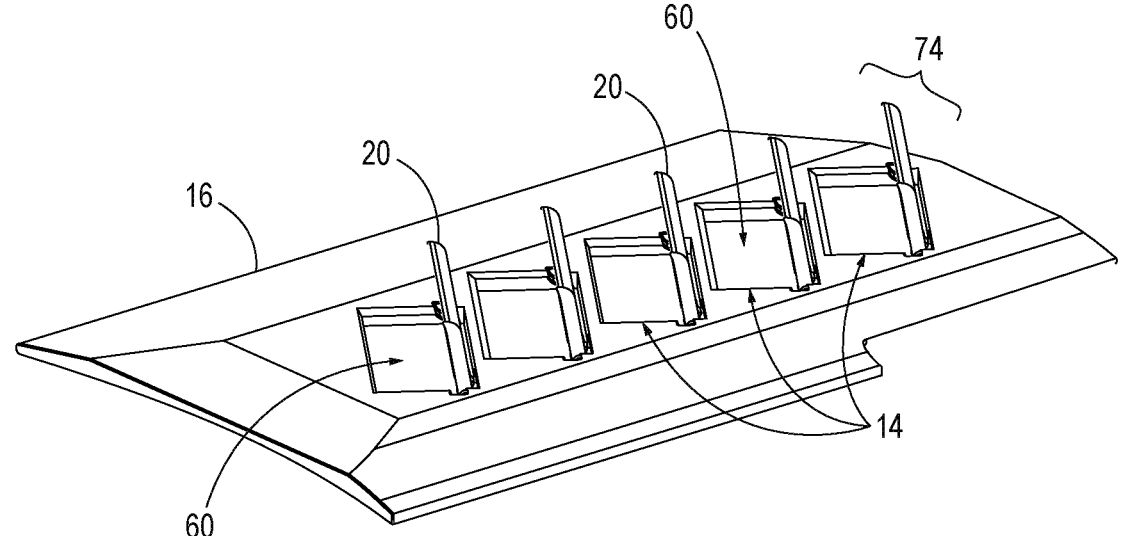
FIG. 11 is a perspective view of an example of a group of vortex generators according to the present disclosure.

FIG. 11 shows another example of a group 74 of vortex generators 14 operatively coupled to aerodynamic surface 16. Vanes 20 of vortex generators 14 are illustrated in the deployed position. Additionally, each respective vane 20 in this example of group 74 is arranged substantially parallel to the other respective vanes 20 of the other respective vortex generators 14 in group 74. Vortex generators 14 may be positioned adjacent one another, as shown in the example of FIG. 11, or vortex generators 14 may be spaced apart and/or arranged in non-parallel orientations with other vortex generators 14 in a given vehicle 10 or aerodynamic surface 16 in various examples within the scope of the present disclosure.

Figure 12:
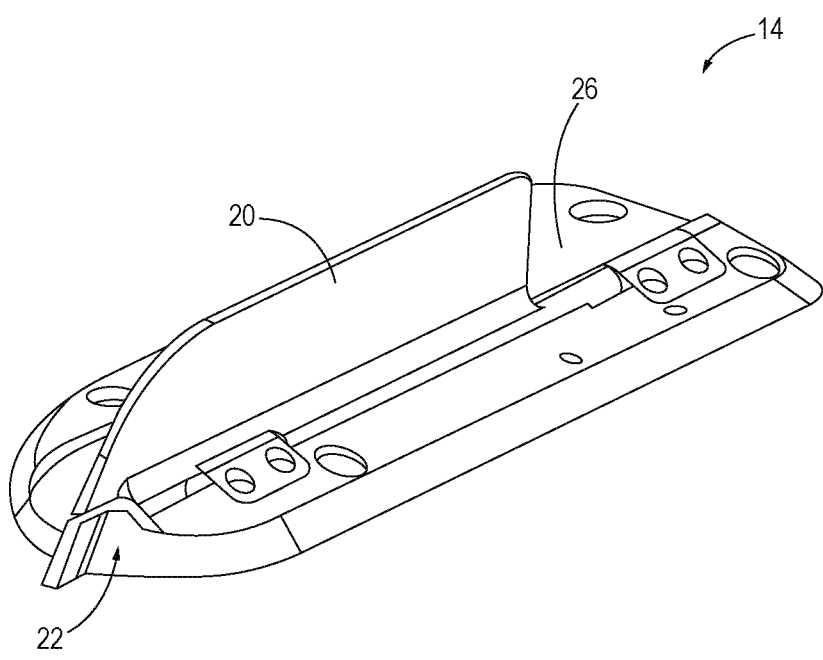
FIG. 12 is a perspective view of an example of a vortex generator according to the present disclosure, in a deployed position.
Figure 13:
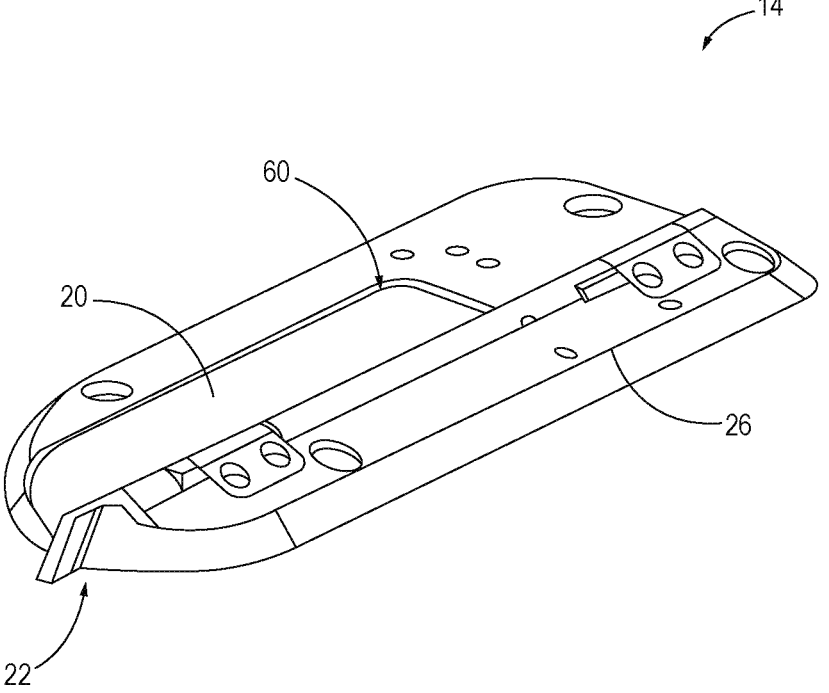
FIG. 13 is a perspective view of the vortex generator of FIG. 12, in a stowed position.

FIGS. 12-13 illustrate another example of vortex generator 14, shown in a deployed position (FIG. 12) and a stowed position (FIG. 13). In the deployed position, vane 20 extends up, or projects up, away from mounting base 26, while in the stowed position, vane 20 may rest within recess 60 of mounting base 26. An elongate tube of spring 22 may be twisted to rotate vane 20 between the stowed and deployed positions, as described herein. Mounting base 26 may be configured to be positioned on an aerodynamic surface (such as a wing of an aircraft), such as via adhesives and/or fasteners, such that vortex generators 14 may be configured for retrofit applications on existing wings and other aerodynamic surfaces.

Figure 14:
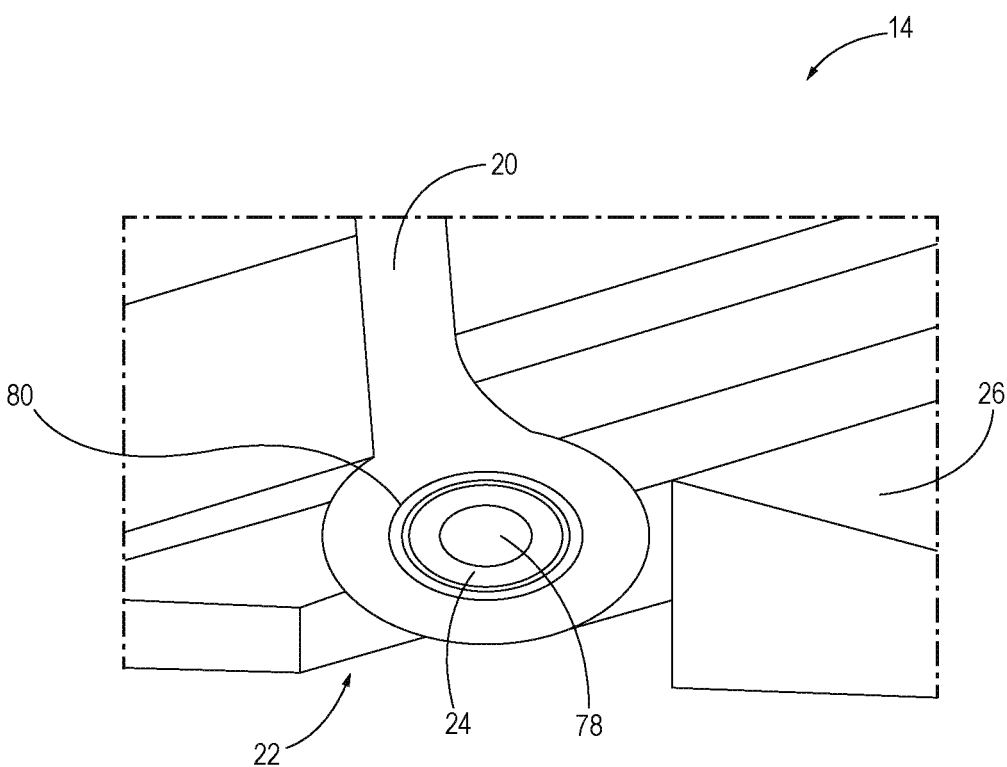
FIG. 14 is a partial perspective view of an example of a vortex generator including a heating element.

FIG. 14 illustrates a portion of an example of vortex generator 14 that includes a heating element 78 positioned within elongate tube 24. An insulation layer 80 may be positioned to surround at least a portion of elongate tube 24 to retain heat within elongate tube 24. Heating element 78 may be actively controlled to deliver a desired amount of heat to elongate tube 24 to elicit the desired superelastic response in elongate tube 24. For example, to adjust or reconfigure the deployment angle of vane 20, heating element 78 may be used to add heat to adjust the response of elongate tube 24.

Figure 15:
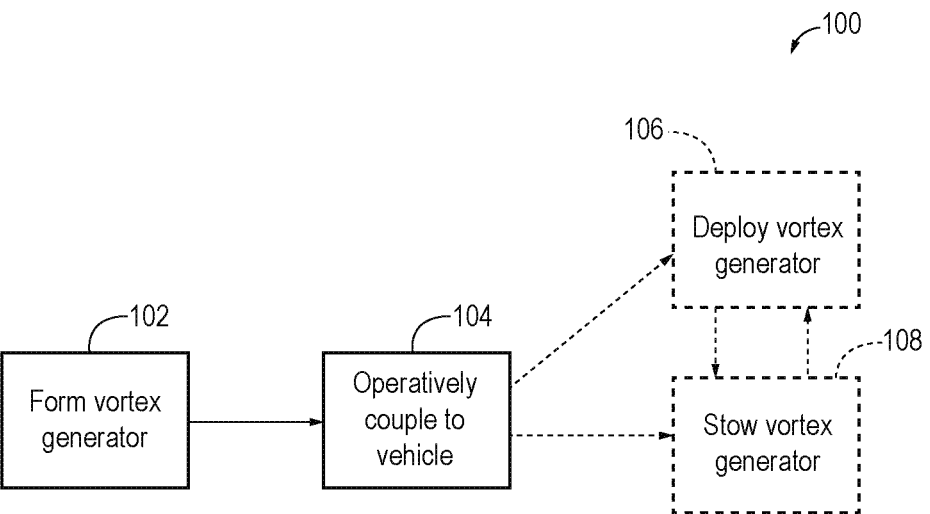
FIG. 15 is a schematic flowchart diagram of methods of deploying a vortex generator according to the present disclosure.

FIG. 15 schematically provides a flowchart that represents illustrative, non-exclusive examples of methods 100 according to the present disclosure. In FIG. 15, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 15 are not limiting and other methods and steps are within the scope of the present disclosure, including methods having greater than or fewer than the number of steps illustrated, as understood from the discussions herein.

In FIG. 15, methods 100 of deploying a vortex generator (e.g., vortex generator 14) may include forming one or more vortex generators at 102 and operatively coupling one or more vortex generators to an aerodynamic surface of a vehicle, at 104. Forming the vortex generator at 102 may include preassembling the vane and the spring to form a subassembly, and positioning the subassembly within a mounting base. Additionally or alternatively, forming the vortex generator at 102 may include adding one or more additional alloying elements to the shape memory alloy, such as to control a transformation temperature of the shape memory alloy. For example, Iron (Fe), Niobium (Nb), Hafnium (Hf), Copper (Cu), Palladium (Pd), Platinum (Pt), and/or Zirconium (Zr) may be added as an additional alloying element to a nickel titanium alloy, or other shape memory alloy. The shape memory alloy composition and processing may be selected to create the desired superelastic response in disclosed springs and elongate tubes of the present vortex generators. Operatively coupling the vortex generator to the aerodynamic surface of the vehicle at 104 may include coupling the mounting base to the wing of an aircraft or to another aerodynamic surface of the aircraft or another vehicle.

Methods 100 also may include deploying the vortex generator at 106 (e.g., moving the vane of the vortex generator to the deployed position) and/or stowing the vortex generator at 108 (e.g., moving the vane of the vortex generator to the stowed position). In some examples, deploying the vortex generator at 106 includes operating the vehicle such that a load is applied to the aerodynamic surface sufficient to induce a superelastic stress response in the shape memory alloy of the elongate tube, and thereby rotate the vane to the deployed position. Similarly, stowing the vortex generator at 108 may include operating the vehicle such that a load is reduced or removed from the aerodynamic surface such that torque is released from the elongate tube and the vane is rotated to the stowed position. Additionally or alternatively, stowing the vortex generator at

108 may include exerting a force on the vane of the vortex generator, such as via a flap of the vehicle, thereby moving the vane to the stowed position.

Illustrative, non-exclusive examples of inventive subject matter according to the present disclosure are described in the following enumerated paragraphs:

A1. A vortex generator (14), comprising:

a vane (20) configured to be operatively coupled to an aerodynamic surface (16) of a vehicle (10), wherein the vane (20) is configured to rotate between a stowed position and a deployed position; and a spring (22) operatively coupled to the vane (20), the spring (22) comprising an elongate tube (24) comprising a superelastic shape memory alloy, wherein the spring (22) is configured to cause the vane (20) to rotate from the stowed position to the deployed position when the elongate tube (24) is twisted in a first direction (28), wherein the elongate tube (24) is configured to twist in the first direction (28) due to a stress-induced response that causes the elongate tube (24) to twist.

A1.1. The vortex generator (14) of paragraph A1, wherein the elongate tube (24) is configured to undergo a stress-induced phase transformation as a result of activation of the spring (22) that twists the elongate tube (24) in the first direction (28).

A1.2. The vortex generator (14) of paragraph A1 or A1.1, wherein the elongate tube (24) is configured to act as a rotary spring.

A1.3. The vortex generator (14) of any of paragraphs A1-A1.2, wherein the spring (22) is configured such that the vane (20) is rotated from the deployed position to the stowed position when the elongate tube (24) is twisted in a second direction (30) opposite from the first direction (28).

A2. The vortex generator (14) of any of paragraphs A1-A1.3, wherein the spring (22) is configured to cause the vane (20) to rotate from the deployed position to the stowed position when a load causing the stress-induced response is reduced or removed.

A3. The vortex generator (14) of any of paragraphs A1-A2, wherein the spring (22) comprises a support shell (36), wherein the elongate tube (24) is rotatably retained in the support shell (36), wherein the vane (20) is fixed to the elongate tube (24) such that when the elongate tube (24) is twisted, the vane (20) rotates with the elongate tube (24) relative to the support shell (36).

A3.1. The vortex generator (14) of paragraph A3, wherein the support shell (36) is configured to act as a rotational bearing.

A4. The vortex generator (14) of any of paragraphs A1-A3.1, further comprising a mounting base (26) configured to receive the vane (20) when the vane (20) is in the stowed position, wherein the mounting base (26) is configured to operatively couple the vortex generator (14) to the aerodynamic surface (16) of the vehicle (10).

A5. The vortex generator (14) of paragraph A4, wherein the mounting base (26) is configured to be coupled to the aerodynamic surface (16) of the vehicle (10) via one or more fasteners.

A6. The vortex generator (14) of paragraph A4 or A5, wherein the mounting base (26) is configured to be coupled to the aerodynamic surface (16) of the vehicle (10) via epoxy and/or an adhesive.

A7. The vortex generator (14) of any of paragraphs A1-A6, wherein the vortex generator (14) is configured to be reconfigurable.

A8. The vortex generator (14) of any of paragraphs A1-A7, wherein the vortex generator (14) is configured to be surface-mounted such that it does not protrude through the aerodynamic surface (16) of the vehicle (10).

A9. The vortex generator (14) of any of paragraphs A1-A8, wherein a spring rate of the elongate tube (24) is configured to be actively tuned for changing environmental conditions by heating the shape memory alloy.

A10. The vortex generator (14) of any of paragraphs A1-A9, wherein the vane (20) is configured to be moved to the stowed position by a flap of the vehicle (10).

A11. The vortex generator (14) of any of paragraphs A1-A10, wherein the spring (22) comprises a linear actuator and a rotary actuator.

A12. The vortex generator (14) of any of paragraphs A1-A11, wherein the spring (22) comprises:

a first torque flange (52) that is fixed with respect to a slot (56) in a/the mounting base (26); and a second torque flange (54) that is fixed with respect to the vane (20).

A13. The vortex generator (14) of any of paragraphs A1-A12, wherein the vane (20) and the spring (22) are preassembled and configured to be positioned within a/the mounting base (26).

A14. The vortex generator (14) of any of paragraphs A1-A13, wherein the spring (22) is configured to rotate the vane (20) relative to a/the support shell (36) from the stowed position to the deployed position, wherein in the stowed position the vane (20) is parallel to the aerodynamic surface (16), and wherein in the deployed position the vane (20) is non-parallel to the aerodynamic surface (16).

A15. The vortex generator (14) of any of paragraphs A1-A14, wherein the spring (22) is configured to move the vane (20) in response to an increase in temperature of the spring (22) and/or in response to a decrease in temperature of the spring (22).

A16. The vortex generator (14) of any of paragraphs A1-A15, wherein a first end (32) of the elongate tube (24) is fixed with respect to a/the mounting base (26).

A16.1. The vortex generator (14) of paragraph A16, wherein the vane (20) is coupled to the elongate tube (24) within a region of the elongate tube (24) adjacent the first end (32) of the elongate tube (24).

A17. The vortex generator (14) of any of paragraphs A1-A16, wherein a/the first end (32) of the elongate tube (24) is fixed with respect to the aerodynamic surface (16) of the vehicle (10).

A17.1. The vortex generator (14) of any of paragraphs A1-A17, wherein the elongate tube (24) is configured such that torque is built up within the elongate tube (24) as the stress-induced response causes the elongate tube (24) to twist.

A17.2. The vortex generator (14) of any of paragraphs A1-A17.1, wherein the elongate tube (24) is configured to transmit torque to the vane (20).

A18. The vortex generator (14) of any of paragraphs A1-A17.2, wherein a second end (34) of the elongate tube (24) is free to rotate with respect to a/the mounting base (26) and the aerodynamic surface (16) of the vehicle (10).

A18.1. The vortex generator (14) of paragraph A18, wherein the vane (20) is coupled to the elongate tube (24) within a region of the elongate tube (24) adjacent the second end (34) of the elongate tube (24).

A19. The vortex generator (14) of any of paragraphs A1-A18.1, wherein the vane (20) is oriented such that an airflow around or along the aerodynamic surface (16) acts to urge the vane (20) towards the deployed position.

A19.1. The vortex generator (14) of any of paragraphs A1-A19, wherein the vortex generator (14) is configured such that the vane (20) transitions to the deployed position due to aerodynamic load created by an/the airflow.

A20. The vortex generator (14) of any of paragraphs A1-A18.1, wherein the vane (20) is oriented such that an airflow around or along the aerodynamic surface (16) acts to urge the vane (20) towards the stowed position.

A21. The vortex generator (14) of any of paragraphs A1-A20, wherein the shape memory alloy comprises 50-51.5% nickel.

A22. The vortex generator (14) of any of paragraphs A1-A21, wherein the shape memory alloy comprises a nickel titanium alloy.

A23. The vortex generator (14) of any of paragraphs A1-A22, wherein the shape memory alloy comprises one or more additional alloying elements configured to control the transformation temperature of the shape memory alloy.

A24. The vortex generator (14) of paragraph A23, wherein the one or more additional alloying elements comprises one or more selected from the group consisting of Iron (Fe), Niobium (Nb), Hafnium (Hf), Copper (Cu), Palladium (Pd), Platinum (Pt), and Zirconium (Zr).

A25. The vortex generator (14) of any of paragraphs A1-A24, further comprising a stop configured to prevent rotation of the vane (20) beyond a predetermined position relative to the aerodynamic surface (16).

A26. The vortex generator (14) of paragraph A25, wherein in the predetermined position the vane (20) is perpendicular to the aerodynamic surface (16).

A27. The vortex generator (14) of any of paragraphs A1-A26, wherein the vehicle (10) comprises an aircraft, a spacecraft, a land vehicle, and/or a marine vehicle.

A28. The vortex generator (14) of any of paragraphs A1-A27, wherein the vane (20) comprises a leading edge (38) and a trailing edge (40).

A29. The vortex generator (14) of any of paragraphs A1-A28, wherein the spring (22) is passively actuated.

A30. The vortex generator (14) of any of paragraphs A1-A29, wherein the vortex generator (14) is configured to reduce noise during takeoff and landing when the vane (20) is in the deployed position.

A31. The vortex generator (14) of any of paragraphs A1-A30, wherein the vortex generator (14) is configured such that the vane (20) has a controlled deployment angle (42) in the deployed position, wherein the deployment angle is an angle formed between the vane (20) and the aerodynamic surface (16).

A32. The vortex generator (14) of any of paragraphs A1-A31, wherein the vortex generator (14) is configured such that the vane (20) is in the stowed position when a/the flaps of the vehicle (10) are stowed.

A33. The vortex generator (14) of any of paragraphs A1-A32, wherein the vortex generator (14) is configured to have a reduced drag when the vane (20) is in the stowed position than when the vane (20) is in the deployed position.

B1. An aircraft system (62), comprising:
the vortex generator (14) of any of paragraphs A1-A33.

B2. The aircraft system (62) of paragraph B1, further comprising the aerodynamic surface (16) of the vehicle (10), wherein the vehicle (10) comprises an aircraft (64).

B3. The aircraft system (62) of paragraph B2, wherein the aerodynamic surface (16) comprises a portion of a wing (66) of the aircraft (64).

B4 The aircraft system (62) of any of paragraphs B1-B3, further comprising a/the mounting base (26), wherein the mounting base (26) is configured to receive the vane (20) when the vane (20) is in the stowed position.

B5. The aircraft system (62) of paragraph B4, wherein the mounting base (26) is configured to operatively couple the vortex generator (14) to the aerodynamic surface (16) of the aircraft (64).

B6. The aircraft system (62) of any of paragraphs B4-B5, wherein the mounting base (26) is coupled to the aerodynamic surface (16) of the aircraft (64) via one or more fasteners.

B7. The aircraft system (62) of any of paragraphs B4-B6, wherein the mounting base (26) is coupled to the aerodynamic surface (16) of the aircraft (64) via epoxy and/or an/the adhesive.

B8. The aircraft system (62) of any of paragraphs B1-B7, wherein the vortex generator (14) is surface-mounted to the aerodynamic surface (16) of the aircraft (64) such that the vortex generator (14) does not protrude through the aerodynamic surface (16) of the aircraft (64).

B9. The aircraft system (62) of any of paragraphs B1-B8, further comprising a flap (76) of the aircraft (64), wherein the flap (76) is configured to act on the vortex generator (14) to transition the vane (20) to the stowed position.

B10. The aircraft system (62) of any of paragraphs B1-B9, wherein the vane (20) and the spring (22) are preassembled and configured to be positioned within a/the mounting base (26).

B11. The aircraft system (62) of any of paragraphs B1-B10, wherein the vane (20) is oriented with respect to the aerodynamic surface (16) of the aircraft (64) such that an airflow around or along the aerodynamic surface (16) acts to urge the vane (20) towards the deployed position.

B12. The aircraft system (62) of any of paragraphs B1-B10, wherein the vane (20) is oriented with respect to the aerodynamic surface (16) of the aircraft (64) such that an airflow around or along the aerodynamic surface (16) acts to urge the vane (20) towards the stowed position.

B13. The aircraft system (62) of any of paragraphs B1-B12, further comprising a stop configured to prevent rotation of the vane (20) beyond a predetermined position relative to the aerodynamic surface (16) of the aircraft (64).

B14. The aircraft system (62) of any of paragraphs B1-B13, wherein the vortex generator (14) is configured such that the vane (20) is in the stowed position when a/the flaps (76) of the aircraft (64) are stowed.

C1. A method (100) of deploying a vortex generator (14), the method (100) comprising:

forming (102) the vortex generator (14) of any of paragraphs A1-A33; and operatively coupling (104) the vortex generator (14) to the aerodynamic surface (16) of the vehicle (10).

C2. The method (100) of paragraph C1, further comprising operating the vehicle (10) such that a load is applied to the aerodynamic surface (16) sufficient to induce a stress response in the elongate tube (24) and rotate the vane (20) to the deployed position.

C3. The method (100) of any of paragraphs C1-C2, further comprising operating the vehicle (10) such that a/the load is reduced or removed from the aerodynamic surface (16) such that torque is released from the elongate tube (24) and the vane (20) is rotated to the stowed position.

C4. The method (100) of any of paragraphs C1-C3, further comprising exerting a force on the vane (20) via a flap of the vehicle (10) to move the vane (20) to the stowed position.

C5. The method (100) of any of paragraphs C1-C4, wherein the forming (102) the vortex generator (14) comprises:

preassembling the vane (20) and the spring (22) to form a subassembly; and positioning the subassembly within a mounting base (26);

wherein the operatively coupling (104) the vortex generator (14) to the aerodynamic surface (16) of the vehicle (10) comprises coupling the mounting base (26) to the wing.

C6. The method (100) of any of paragraphs C1-C5, wherein the forming (102) the vortex generator (14) comprises adding one or more additional alloying elements to the shape memory alloy to control a transformation temperature of the shape memory alloy.

C7. The method (100) of paragraph C6, wherein the one or more additional alloying elements comprises one or more selected from the group consisting of Iron (Fe), Niobium (Nb), Hafnium (Hf), Copper (Cu), Palladium (Pd), Platinum (Pt), and Zirconium (Zr).

D1. The use of the vortex generator (14) of any of paragraphs A1-A33 to reduce noise during takeoff and landing when the vane (20) is in the deployed position.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A vortex generator, comprising:
a vane configured to be operatively coupled to an aerodynamic surface of a vehicle, wherein the vane is configured to rotate between a stowed position and a deployed position, wherein the vortex generator is configured to reduce noise created by an airflow around or along the aerodynamic surface when the vane is in the deployed position;
a spring operatively coupled to the vane, the spring comprising an elongate tube comprising a superelastic shape memory alloy, wherein the spring is configured to cause the vane to rotate from the stowed position to the deployed position when the elongate tube is twisted in a first direction, wherein the elongate tube is configured to twist in the first direction due to a stress-induced response that causes the elongate tube to twist, wherein the elongate tube is configured to undergo a stress-induced phase transformation as a result of activation of the spring that twists the elongate tube in the first direction; and
a mounting base configured to receive the vane when the vane is in the stowed position, wherein the mounting base is configured to operatively couple the vortex generator to the aerodynamic surface of the vehicle, wherein a first end of the elongate tube is fixed with respect to the aerodynamic surface of the vehicle, wherein a second end of the elongate tube is free to rotate with respect to the mounting base and the aerodynamic surface of the vehicle, and wherein the elongate tube is configured such that torque is built up within the elongate tube as the stress-induced response causes the elongate tube to twist.

2. The vortex generator according to claim 1, wherein the spring is configured to cause the vane to rotate from the deployed position to the stowed position when a load causing the stress-induced response is reduced or removed.

3. The vortex generator according to claim 1, wherein the spring comprises a support shell, wherein the elongate tube is rotatably retained in the support shell, wherein the vane is fixed to the elongate tube such that when the elongate tube is twisted, the vane rotates with the elongate tube relative to the support shell, wherein the spring is configured to rotate the vane relative to the support shell from the stowed position to the deployed position, wherein in the stowed position the vane is parallel to the aerodynamic surface, and wherein in the deployed position the vane is non-parallel to the aerodynamic surface.

4. The vortex generator according to claim 1, wherein the vortex generator is configured to be surface-mounted such that it does not protrude through the aerodynamic surface of the vehicle.

5. The vortex generator according to claim 4, wherein the first end of the elongate tube is fixed with respect to the mounting base.

6. The vortex generator according to claim 1, wherein a spring rate of the elongate tube is configured to be actively tuned for changing environmental conditions by heating the superelastic shape memory alloy, such that the vortex generator is configured to be reconfigurable.

7. The vortex generator according to claim 1, wherein the vane is oriented such that the vane is urged towards the deployed position by the airflow around or along the aerodynamic surface, and wherein the vortex generator is configured such that the vane transitions to the deployed position due to aerodynamic load created by the airflow.

8. The vortex generator according to claim 1, wherein the superelastic shape memory alloy comprises between 50-51.5 atomic percent (at %) nickel, and wherein the superelastic shape memory alloy comprises a nickel titanium alloy.

9. The vortex generator according to claim 1, wherein the vortex generator is configured such that the vane has a controlled deployment angle in the deployed position, and wherein the deployment angle is an angle formed between the vane and the aerodynamic surface.

10. An aircraft system for an aircraft, comprising:
The vortex generator according to claim 1, wherein the vane is configured to be moved to the stowed position by a flap of the aircraft;
The aerodynamic surface, wherein the aerodynamic surface comprises a portion of a wing of the aircraft.

11. The aircraft system according to claim 10, wherein the vortex generator is surface-mounted to the aerodynamic surface of the aircraft such that the vortex generator does not protrude through the wing.

12. The aircraft system according to claim 10, further comprising the flap of the aircraft.

13. The aircraft system according to claim 10, wherein the vane is oriented with respect to the aerodynamic surface of the aircraft such that vane is configured to be urged towards the deployed position by the airflow around or along the aerodynamic surface.

14. The aircraft system according to claim 10, further comprising a stop configured to prevent rotation of the vane beyond a predetermined controlled deployment angle relative to the aerodynamic surface.

15. The aircraft system according to claim 10, wherein the vortex generator is configured such that the vane is in the stowed position when the flap is stowed.

16. A method, comprising:
forming the vortex generator according to claim 1; and
operatively coupling the vortex generator to the aerodynamic surface of the vehicle, wherein the vehicle comprises an aircraft, and wherein the aerodynamic surface of the vehicle comprises a wing of the aircraft.

17. The method according to claim 16, further comprising operating the aircraft such that a load is applied to the wing sufficient to induce a stress response in the elongate tube and rotate the vane to the deployed position.

18. The method according to claim 17, further comprising operating the aircraft such that the load is reduced or removed from the wing, thereby releasing torque from the elongate tube such that the vane is rotated to the stowed position.

19. The method according to claim 16, further comprising exerting a force on the vane via a flap of the aircraft, thereby moving the vane to the stowed position.

20. The method according to claim 16, wherein the forming the vortex generator comprises:
preassembling the vane and the spring to form a subassembly; and
positioning the subassembly within the mounting base;

wherein the operatively coupling the vortex generator to the aerodynamic surface of the aircraft comprises coupling the mounting base to the wing.

\* \* \* \* \*